United States Patent [19]

Kraus

[11] Patent Number: 4,885,955
[45] Date of Patent: Dec. 12, 1989

[54] MULTIMODE INFINITELY VARIABLE TRANSMISSION

[75] Inventor: Charles E. Kraus, Austin, Tex.
[73] Assignee: Excelermatic Inc., Austin, Tex.
[21] Appl. No.: 328,681
[22] Filed: Mar. 27, 1989
[51] Int. Cl.[4] .................. F16H 37/00; F16H 37/06
[52] U.S. Cl. ........................................ 74/691; 74/199; 74/681; 74/796
[58] Field of Search .................. 74/691, 750 R, 689, 74/690, 740, 665 GE

[56] References Cited

U.S. PATENT DOCUMENTS

| | | | |
|---|---|---|---|
| 2,923,177 | 2/1960 | Winchester | 74/740 |
| 3,739,658 | 6/1973 | Scheiter | 74/691 X |
| 4,297,918 | 11/1981 | Perry | 74/690 |

FOREIGN PATENT DOCUMENTS 1011942  4/1984  U.S.S.R. ................. 74/690

*Primary Examiner*—Dwight G. Diehl
*Assistant Examiner*—Khoi Q. Ta

[57] ABSTRACT

A multimode infinitely variable traction roller transmission including a toroidal traction roller transmission for infinitely varying the transmission ratio in each of the modes. Power is transmitted from an input shaft to the planet carrier of a planetary transmission whose ring is associated with the output shaft of the transmission and through the toroidal traction roller transmission to the sun of the planetary transmission selectively by way of a chain gear or spur gear transmission provided with clutches for selective engagement thereof, that is, for rotation of the sun in one or the opposite direction. A brake structure is provided for locking the planet carrier in one of the transmission modes. Output shaft speed is increased by increasing output speed of the infinitely variable transmission in the first mode (direct mode), it is further increased by subsequently decreasing the output speed of the infinitely variable transmission in the second mode (inverse regeneration mode) and it is then further increased by again increasing the output speed of the infinitely variable transmission in the third mode (split torque mode). The changeover is smooth thereby providing for a wide ratio range infinitely variable transmission.

3 Claims, 5 Drawing Sheets

MULTIMODE INFINITELY VARIABLE TRANSMISSION

BACKGROUND OF THE INVENTION

The present invention relates to an infinitely variable traction roller transmission for the transmission of power over a large transmission ratio range.

Infinitely variable transmissions have generally a relatively limited ratio range and a limited torque transmission capability. Partly as a result of this they are not used in connection with large cars or trucks. Trucks require a full power transmission load capability at very low speeds, for example, when climbing a mountain road since, for their large weight, they have relatively small engines of relatively low power output and yet, at long level road stretches, they reach high speeds. A large transmission ratio range is therefore needed to provide sufficient torque at the drive wheels at start up or during climbing and to avoid engine overspeed at high vehicle travel speeds.

It is also important that trucks operate efficiently, that is, at optimum engine speed independently of the vehicle speed. An infinitely variable transmission would therefore be most desirable. Unfortunately no rugged infinitely variable transmissions with large transmission ratio range are in existence.

Infinitely variable transmissions and more specifically infinitely variable traction roller transmissions are well known. Those with which the present invention is concerned are generally of the type as shown, for example, in applicant's U.S. Pat. No. 4,086,820 of May 2, 1978, or in applicant's U.S. Pat. No. 4,702,118. However, in order to accommodate the power as needed in connection with trucks, such transmissions would have to be large and heavy and they would require additional mechanical gear shift transmissions in order to achieve the needed transmission ratio ranges.

It is therefore the principal object of the present invention to provide an infinitely variable traction roller transmission which is relatively small but capable of handling the power for driving heavy trucks at low and high truck operating speeds at optimum engine speed.

SUMMARY OF THE INVENTION

In a multimode infinitely variable traction roller transmission which has coaxial input and output shafts and a parallel transmission shaft supported in a housing in spaced parallel relationship from the input and output shafts but for rotation with the input shaft, the parallel shaft includes two infinitely variable transmission structures with outer toric discs mounted on the parallel shaft and inner toric discs mounted on opposite ends of a hollow first shaft through which the parallel shaft extends and which carries a chain and a spur gear each operatively engaged with corresponding chain and spur gears disposed on a second hollow shaft which is coaxial with the input and output shafts and which carries the sun of a planetary type transmission whose ring is associated with the transmission output shaft and whose planet carrier is mounted on one end of an intermediate shaft which extends through the second hollow shaft and at its other end carries the clutch bell of a first clutch structure for engagement with the input shaft. The clutch bell is also provided with a brake structure for locking the intermediate shaft and the planet carrier when the first clutch structure is disengaged. Second and third clutch structures are associated with the chain and spur gears preferably on the second hollow shaft for selectively coupling the second hollow shaft and the sun associated therewith for rotation in the same or the opposite direction of the first hollow shaft.

The speed of the first hollow shaft with respect to the input shaft is infinitely variable by the infinitely variable traction roller transmission structures and the transmission is furthemore operable in three forward modes and one reverse mode. At one end of the ratio range of the infinitely variable transmission structure a switchover from one mode to the next provides for continuous infinite ratio change while moving the transmission ratio back to the other end of the ratio range so that continuously infinitely variable transmission ratio variations can be achieved over a large range, that is, over all three modes. It is also noted that in the two higher speed modes only a portion of the power passes through the infinitely variable transmission structures which keeps wear to a minimum.

SHORT DESCRIPTION OF THE DRAWINGS

FIG. 1 is a cross-sectional view of the transmission along a plane receiving the transmission shafts; and FIGS. 2 to 5 show the transmission schematically in the various modes indicating the torque flow through the transmission.

DESCRIPTION OF THE PREFERRED EMBODIMENT

Figure 1:
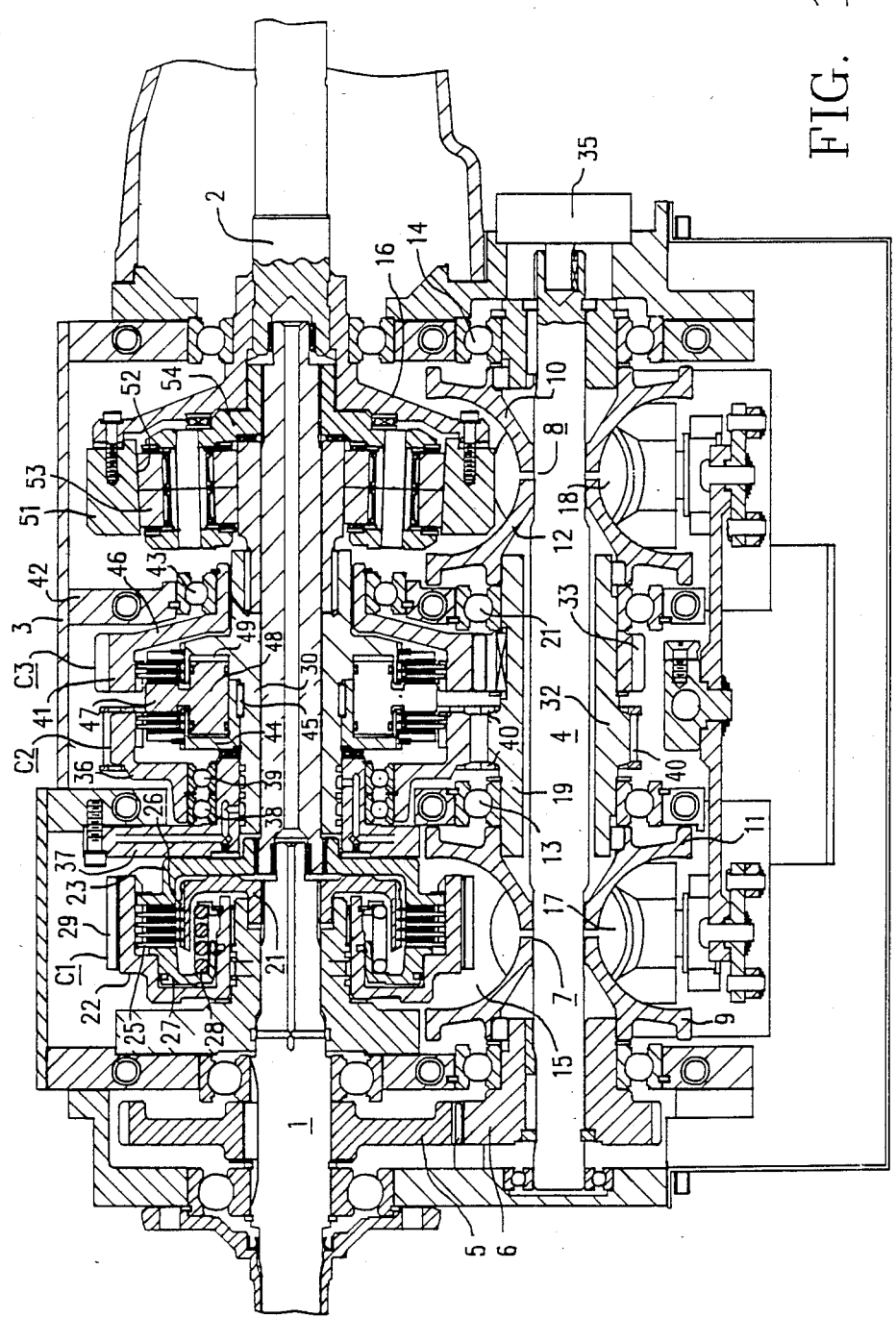

The traction roller transmission as shown in FIG. 1 has an input shaft 1 and an output shaft 2 supported in a housing 3 in axial alignment with one another; a parallel shaft 4 is rotatably supported in spaced parallel relatonship from the input and output shafts 1 and 2. The input shaft 1 has a spur gear 5 mounted thereon which is in engagement with a spur gear 6 mounted on the parallel shaft 4 for rotation therewith. The parallel shaft 4 has two infinitely variable toroidal traction roller transmission structures 7 and 8 associated therewith. Both are identical and generally of the type as described, for example, in applicant's earlier application Ser. No. 259,043 of Oct. 17, 1988. Transmission structures 7 and 8 have toric discs 9 and 11, and 12 and 10 arranged opposite one another so as to define toric cavities 15 and 16 therebetween in which motion transmitting traction rollers 17 and 18 are pivotally supported in engagement with the toric discs so as to be able to transmit motion therebetween at a transmission ratio which depends on the pivot position of the traction rollers 17 and 18.

Toric discs 9 and 10 are both mounted for rotation with the parallel shaft 4 and the toric discs 11 and 12 are both mounted on a first hollow shaft 19 which is disposed between the infinitely variable toric transmission structures 7 and 8 and through which the parallel shaft 4 extends. The transmission structure arrangement and its operation is described in greater detail in applicant's application Ser. No. 259,043 mentioned before. It is noted nevertheless that the arrangement permits infinite variation of the transmission ratio between the parallel shaft 4 and the hollow shaft 19 which rotates in a direction opposite to that of the parallel shaft 4 over a predetermined ratio range.

The hollow shaft 19 is rotatably supported by ball bearings 13 and 14 and is provided with a chain gear 32 and spur gear 33 for transmitting power to the output shaft depending on the power transmission mode.

The input shaft 1 is provided at its inner end with a first clutching structure C1 which includes a clutch plate carrier 21 mounted on the input shaft 1 and a clutch bell 22 mounted, by way of a mounting plate 23, for rotation with an intermediate shaft 24 which is supported at its opposite ends on, and extends between, the input shaft 1 and the output shaft 2. A plurality of clutch plates 25, 26 are arranged between the clutch bell 22 and the clutch plate carrier 21, alternately in engagement with one and the other, and a piston 27 is disposed in the clutch bell 22 and adapted to force the clutch plates 25 and 26 into firm engagement with one another against the force of a spring 28 when transmission of power through the clutch is desired. A brake band 29 extends around the clutch bell for engagement therewith when the clutch bell 22 and the intermediate shaft 24 are to be locked. The intermediate shaft 24 extends through a second hollow shaft 30 which has two clutch structures associated therewith, a chain gear (second) clutch structure C2 and a spur gear (third) clutch structure C3. The chain gear clutch structure C2 is disposed in a chain gear 36 which is rotatably supported on a housing wall 37 by roller bearings 38, 39 and which is in power transmitting engagement with the chain gear 32 of the first hollow shaft 19 by way of a chain 40. The spur gear clutch structure C3 is disposed in a spur gear 41 which is rotatably supported on the housing wall 42 by way of ball bearing 43. The chain gear clutch structure C2 includes a clutch support plate 44 which is keyed to the second hollow shaft 30 by keys 45 and the spur gear clutch structure includes a clutch support plate 46 which is integral with the second hollow shaft 30. Both clutch structures have clutch discs alternately mounted on the respective clutch discs and the respective chain gear and spur gear with a clutch engagement member 47 disposed therebetween. The clutch engagement member 47 is formed integral with an operating piston 48 disposed in a cylinder 49 so that the engagement member 47 can be forced hydraulically in one direction to engage the clutch structure C2 in the chain gear 36 so as to operatively engage the chain gear 36 with the second hollow shaft 30 for rotation thereof with, and in the same sense as, the first hollow shaft 19, and in the opposite direction for engagement of the clutch structure C3 in the spur gear 41 so as to operatively engage the spur gear 41 with the second hollow shaft 30 for rotation thereof with, and in a sense opposite to that of, the first hollow shaft 19. Hydraulic fluid passages are provided in the housing walls and in the shafts but they are not shown in full detail to simplify the drawing. Also the clutch structures C2 and C3 are normal clutches and therefore do not need to be explained in detail.

Keyed to the hollow shaft 30 for rotation therewith is a sun roller 50 which forms the center roller of a planetary type traction roller transmission of the type disclosed in applicant's U.S. Pat. (Ser. No. 07/188,132).

The planetary traction roller transmission includes a traction ring 51 which is mounted for rotation with the transmission output shaft 2 and has a race 52 spaced from the surface of the sun roller 50, with planetary rollers 53 being disposed in the annular space between the traction ring 51 and the sun roller 50. The planetary rollers 53 are supported by a carrier 54 which is firmly mounted on the other end of the intermediate shaft 24.

The planetary carrier 54 is either rotated together with the input shaft 1, when the clutch structure C1 is engaged, or it is locked non-rotatable when the clutch structure C1 is disengaged and the brake band 29 engages the clutch bell 22.

If the clutch structure C2 is engaged, the clutch structure C3 is disengaged and the sun roller rotates in the same direction as the input shaft rotates but at a relative speed which is variable depending on the ratio position of the toroidal traction roller transmission structures 7 and 8. If the clutch structure C3 is engaged, the clutch structure C2 is disengaged and the sun roller rotates in a direction opposite to that of the input shaft and at a relative speed which is variable depending on the ratio position of the toroidal traction roller transmission structures 7 and 8. Obviously the arrangement permits a variety of operating modes: The sun roller 50 may rotate in either direction and the traction roller carrier 54 may either be locked or it may be rotated together with the input shaft 1, all while the sun roller speed—in either direction—is variable relative to the input shaft speed.

Figure 2:
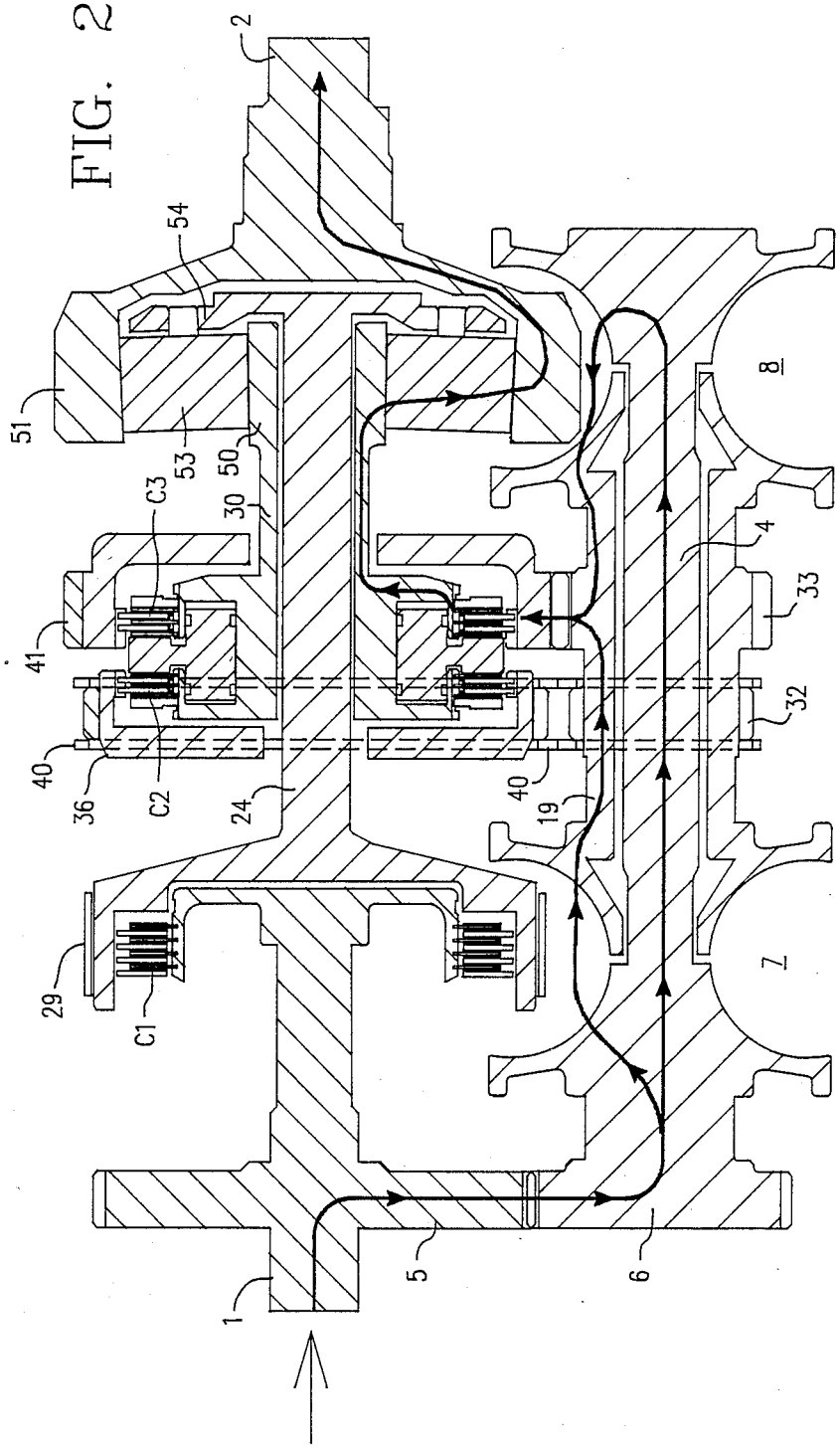

The arrangement provides for various modes of operation which are explained on the basis of FIGS. 2, 3, 4 and 5 in which the power flow through the transmission is schematicaly shown: The first forward mode as shown in FIG. 2 is a direct mode in which clutch C1 is disengaged and the brake band 29 locks the intermediate shaft 24 and the planetary traction roller carrier 54. Clutch C2 is disengaged and clutch C3 is engged so that the sun 50 rotates in a direction opposite to that of the input shaft 1 at a relative speed controlled by the toroidal traction roller transmission structures 7 and 8. The sun 50 transmits its motion through the planetary rollers 53 to the traction ring 51 and the output shaft 2 which rotates in the same direction as the input shaft 1 but at lower speed.

The path of power is from the input shaft 1 through the spur gears 5 and 6 to the parallel shaft 4 and through the toroidal traction roller transmission structures 7 and 8 over the hollow shaft 19 through clutch C3 to the hollow shaft 30 and sun 50 and finally through the planetary traction rollers 53 to the traction ring 51 and the output shaft 2.

Figure 3:
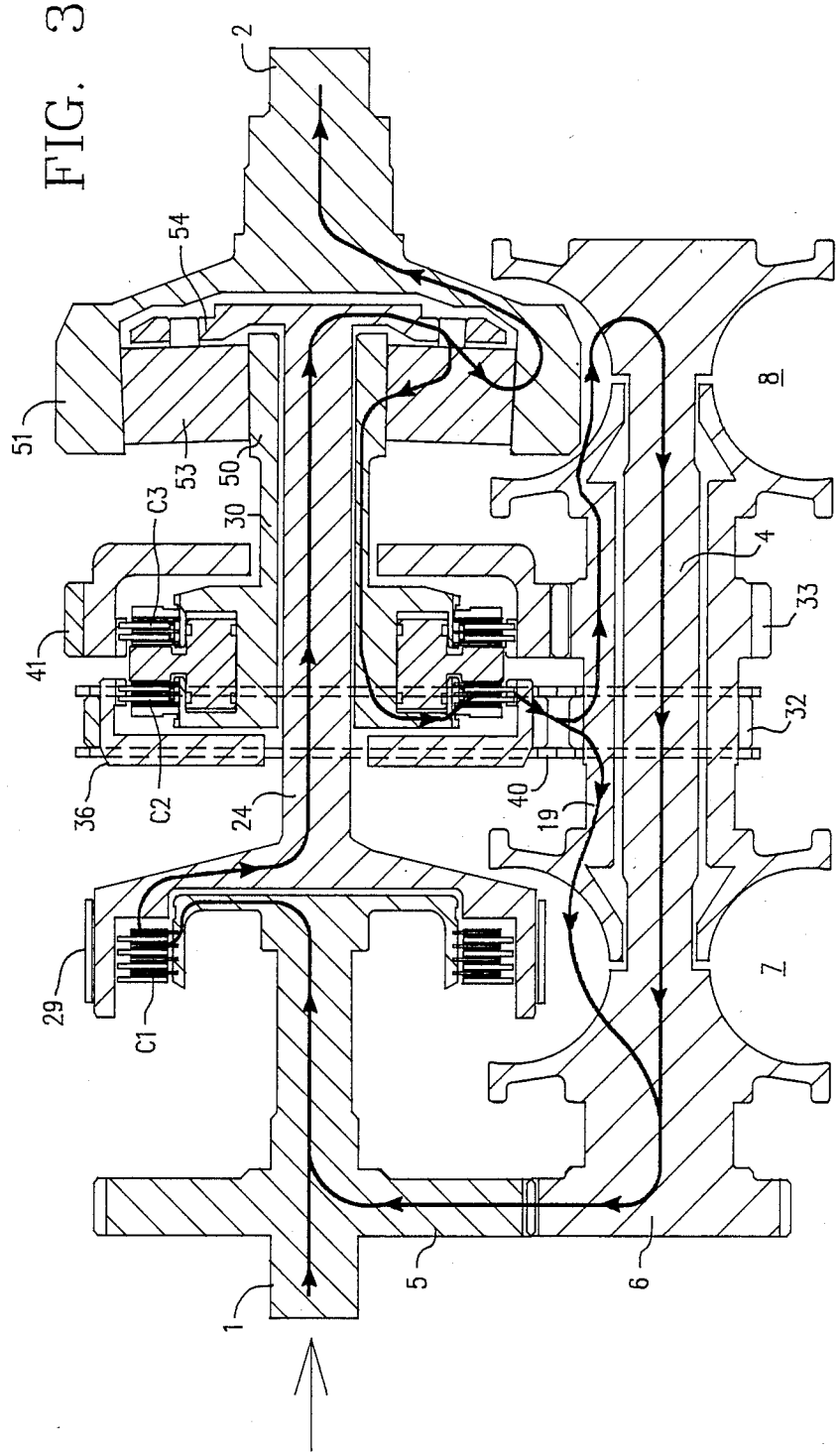

The second forward mode as shown in FIG. 3 is called inverse regeneration mode: Here the clutch C1 is engaged and the brake 29 is released so that the intermediate shaft 24 and the planetary traction roller carrier rotate together with the input shaft 1. The clutch C2 is engaged and the clutch C3 is disengaged so that the sun rotates in the same direction as the input shaft at a relative speed which is variable by the toroidal traction roller transmission. If the sun rotates at the same speed as the input shaft, the planetary rollers 53 are stationary with respect to the sun and the traction ring and the output shaft 2 rotate at the same speed as the input shaft. The transmission ratio is variable so that the output shaft speed varies around the input shaft speed. The path of power is from the input shaft 1 through clutch C1, through the intermediate shaft 24 and the planetary roller carrier 54 and planetary rollers 53 to the traction ring 51 and the output shaft 2. Part of the power, as a result of the reaction torque of the planetary rollers, is returned through the sun, the intermediate shaft 30, chain gears 36 and 32 to the hollow shaft 19 and then through the toroidal traction roller transmission structures 7 and 8 to parallel shaft 4 and through the spur gears 5 and 6 back to the input shaft 1 augmenting the torque through clutch C1 and intermediate shaft 24. However the infinitely variable toric traction roller transmission structures are subjected only to part of the transmitted power through the transmission for the adjustment of the transmission ratio.

Figure 4:
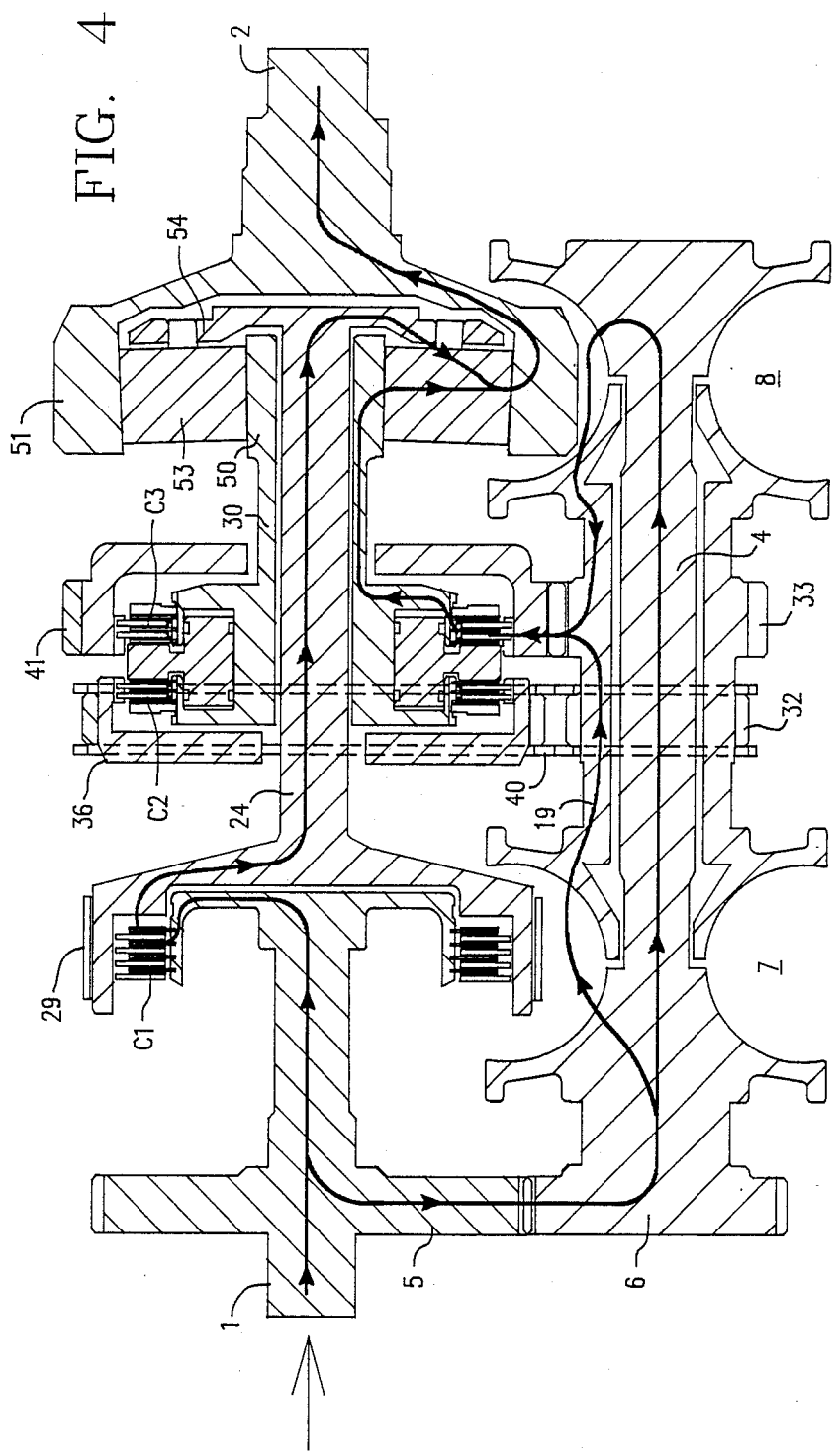

The third forward mode as shown in FIG. 4 is a split-torque mode. Here, clutch C1 is engaged and the band brake 29 is released so that the planetary traction rollers 53 orbit at input shaft speed. Clutch C2 is disengaged and clutch C3 is engaged so that the sun roller rotates in a direction opposite to that of the input shaft at a somewhat lower speed—since gear 5 is somewhat smaller than gear 41 and gear 6 is somewhat larger than gear 33—variable by adjustment of the toroidal traction roller transmission structures 7 and 8. In this mode the output shaft rotates at a speed higher than input shaft speed.

The path of power is split: The first part goes through the clutch C1, the intermediate shaft 24 and the planetary roller carrier to the planetary rollers and finally the traction ring 51 to the output shaft. The second part passes through the spur gears 5 and 6 through the infinitely variable transmission structures 7 and 8 to the hollow shaft 19 and through gears 33 and 41 and clutch C3 to the sun 50 and to the planetary traction rollers 53 where it joins the first part. In this mode which is used by a truck for example during level long-distance driving, the transmission components are exposed to only relatively little stress.

Figure 5:
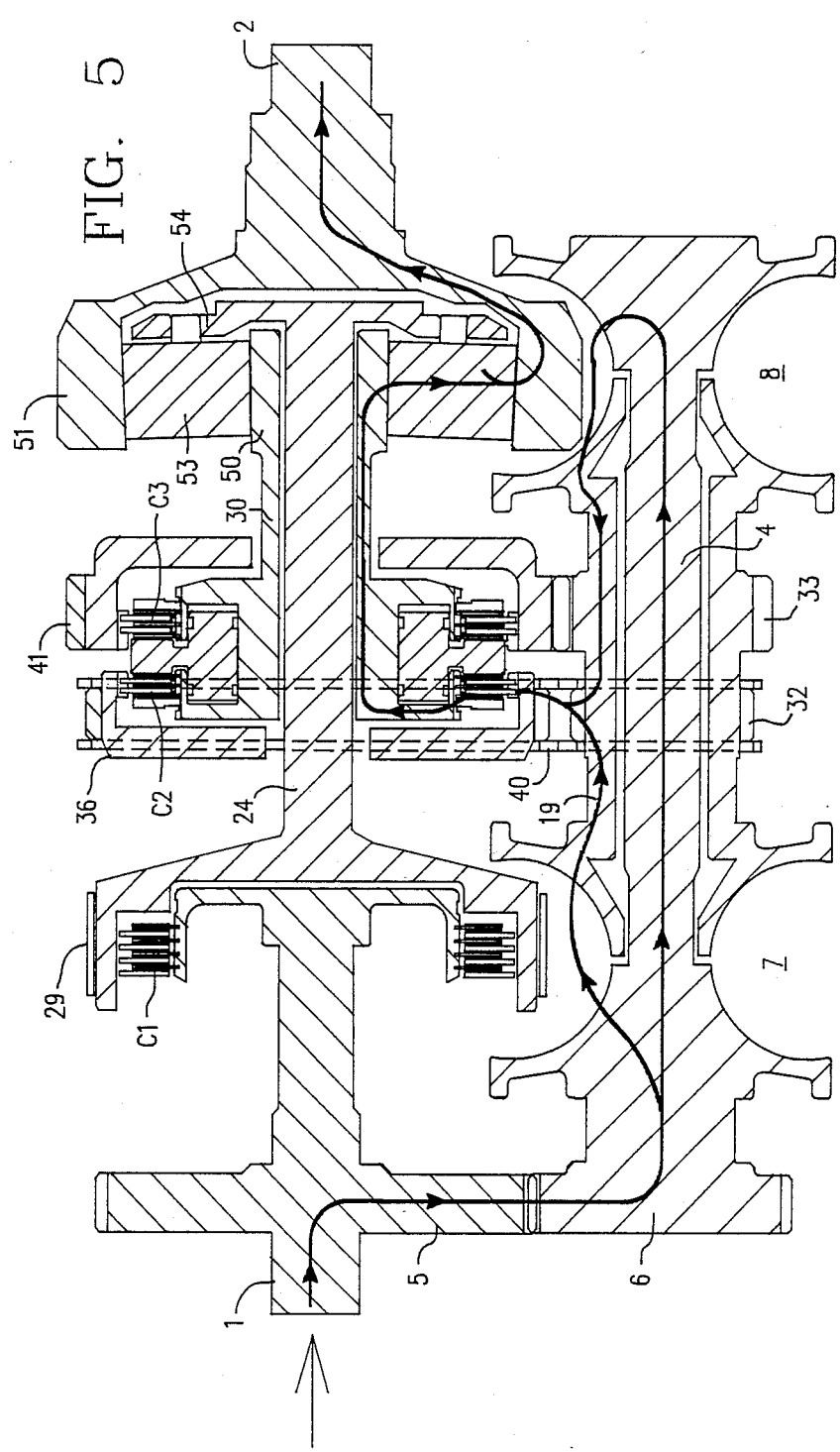

The reverse mode as shown in FIG. 5 is similar to the first mode except that clutch C2 is engaged and clutch C3 is released so that the sun rotates in the same direction as the input shaft 1 and the output shaft 2 rotates in the opposite direction.

Such a transmission is capable of covering a large total transmission ratio in an infinitely variable manner by the appropriate transfer of the power paths and infinite variation of the transmission ratio of the infinitely variable traction roller transmission structures.

The attached operational computer printout gives the transmission ratios across the transmission at mode changeover points.

In this connection it is pointed out that in the first mode (FIG. 2) the speed of the output shaft 2 increases with increasing speed of the output shaft (speed of hollow shaft 19) of the infinitely variable transmission structures. Upon changeover to the second mode at the end of the transmission ratio change in the first mode when hollow shaft 19 is at its highest relative speed, the transmission output shaft speed further increases by reducing the relative speed of the hollow shaft 19 of the infinitely variable transmission structures until, at the lowest relative speed of the hollow shaft 19, a switchover is made to the third mode (FIG. 4) in which the transmission output shaft speed is further increased by again changing the transmission ratio of the infinitely variable transmission structures for increased speed of the hollow shaft 19. As can be seen from the printout, the gear ratios may be so selected that, at the switchover points, the respective clutch members are all the same speed so that no speed adjustment is necessary and the respective clutches can be disengaged or respectively engaged instantly without jerking. The arrangement actually provides continuous infinite speed variation over the full range of the three modes.

It is noted that the transmission has been described with a planetary type traction roller structure as a torque splitting or recombining structure. However a planetary type gear structure may be used just as well. Also the housing and shafts and other components all include the passages necessary for supplying pressurized fluid to the cylinders for the operation of the clutches and the brake band. The hydraulic control fluid supply control arrangement for the infinitely variable traction roller transmission structures is described in applicant's application Ser. No. 07/303,936, filed Jan. 30, 1989. The pressurized fluid may be supplied by external sources or the transmission may include a fluid pump 35 associated for example with the input shaft 1 as shown in FIG. 1.

In the embodiment described pressurized fluid operated clutches C1, C2 and C3 have been utilized mainly because pressurized hydraulic fluid is available since such pressurized hydraulic fluid is utilized for the operation of the infinitely variable traction roller transmission structures 7 and 8. However other types of clutches, for example, electrically operated clutches of the type as used in connection with automotive air conditioner compressors, could be utilized in connection with the transmission according to the present invention.

What is claimed is:

1. A multimode infinitely variable traction roller transmission comprising: a housing; coaxial input and output shafts rotatably supported in said housing; a parallel transmission shaft rotatably supported in said housing is parallel spaced relationship with said input and output shafts, said parallel transmission shaft being operatively connected to said input shaft for rotation therewith; two toric infinitely variable traction roller transmission structures including inner and outer toric discs associated with said parallel shaft, said infinitely variable traction roller transmission structures having their axially outer toric discs mounted for rotation with said parallel transmission shaft and their inner toric discs mounted on a first hollow transmission shaft surrounding said parallel transmission shaft between said toric traction roller transmission structures, each of said toric traction roller transmission structures including motion transmitting traction rollers in engagement with said toric discs and supported pivotally in unison for transmission ratio changing pivot motion; an intermediate shaft rotatably supported between said input and output shafts and having at its one end a first clutch structure for coupling said intermediate shaft selectively with said input shaft and a brake structure for locking said intermediate shaft when said first clutch structure is disengaged, said intermediate shaft carrying at its other end a planetary type transmission including a ring structure mounted for rotation with said output shaft, a planet carrier mounted for rotation with said intermediate shaft and sun structure disposed in engagement with the planets of the planetary transmission and being drivingly connected to a second hollow transmission shaft through which said intermediate shaft extends, said first and second hollow shafts having aligned chain and spur gears engaged with one another such that the chain and spur gears on said second hollow shaft rotate in opposite directions and second and third clutches associated with said chain and spur gears and selectively operable so as to cause rotation of said second hollow shaft and said sun in the same direction or in a direction opposite to the direction, of rotation of said first hollow shaft.

2. An infinitely variable transmission according to claim 1, wherein said chain and spur gears are arranged axially adjacent to one another and said second and third clutches for engaging said chain and spur gears with the respective hollow shaft are disposed between the adjacent chain and spur gears and have a common operating mechanism adapted to cause engagement of one while at the same time causing disengagement of the other of the second and third clutches.

3. An infinitely variable transmission according to claim 1, wherein said infinitely variable toric transmission structures are axially spaced from one another and said first clutch and said planetary type transmission structure are arranged in axially spaced relationship adjacent said infinitely variable toric transmission structures and extend between the toric discs of the respective toric transmission structures thereby allowing a relatively small distance between the input and output and the parallel shafts, and wherein the chain and spur gears of said hollow shafts and the second and third clutches are disposed in the space between said infinitely variable toric transmission structures and said first clutch and said planetary type transmission structure.

* * * * *